(12) United States Patent
Hewitt

(10) Patent No.: US 6,843,625 B2
(45) Date of Patent: Jan. 18, 2005

(54) FLOOR STOP FOR A MOBILE BASE

(75) Inventor: Timothy Hewitt, Pleasant Ridge, MI (US)

(73) Assignee: HTC Products, Inc., Royal Oak, MI (US)

( * ) Notice: Subject to any disclaimer, the term of this patent is extended or adjusted under 35 U.S.C. 154(b) by 0 days.

(21) Appl. No.: 10/723,627

(22) Filed: Nov. 26, 2003

(65) Prior Publication Data

US 2004/0105733 A1 Jun. 3, 2004

Related U.S. Application Data

(60) Provisional application No. 60/429,094, filed on Nov. 26, 2002.

(51) Int. Cl.$^7$ ................................ B62B 5/00; B60S 9/02
(52) U.S. Cl. ..................... 410/66; 410/77; 280/763.1; 280/79.11
(58) Field of Search ..................... 410/66, 77, 80, 410/81, 84; 280/43.17, 43.18, 43.22, 43.24, 47.34, 47.35, 47.41, 79.11, 763.1

(56) References Cited

U.S. PATENT DOCUMENTS

| | | | | | |
|---|---|---|---|---|---|
| 280,273 | A | * | 6/1883 | Wilson | 16/33 |
| 1,051,247 | A | * | 1/1913 | McLendon | 188/7 |
| 1,052,189 | A | * | 2/1913 | Thornley | 482/25 |
| 1,063,620 | A | * | 6/1913 | Thornley | 482/25 |
| 1,747,972 | A | * | 2/1930 | Feldmann | 188/5 |
| 1,999,106 | A | * | 4/1935 | Mueller | 16/34 |
| 2,360,874 | A | * | 10/1944 | Herold | 188/5 |
| 2,712,366 | A | * | 7/1955 | Skupas | 188/5 |
| 2,830,304 | A | * | 4/1958 | Ericsson | 5/11 |
| 2,843,392 | A | * | 7/1958 | Simpkins | 280/43.14 |
| 2,964,327 | A | * | 12/1960 | Mohr | 280/43.24 |
| 3,422,929 | A | * | 1/1969 | Oja et al. | 188/5 |
| 3,727,903 | A | * | 4/1973 | Brown | 269/17 |
| 3,735,841 | A | * | 5/1973 | Auriemma | 188/5 |
| 4,747,180 | A | * | 5/1988 | Screen | 16/35 R |
| 4,886,286 | A | * | 12/1989 | Whorton, III | 280/47.35 |
| 5,035,445 | A | * | 7/1991 | Poulin | 280/763.1 |
| 5,431,254 | A | * | 7/1995 | Kramer et al. | 188/7 |
| 5,628,522 | A | * | 5/1997 | Hall | 280/43.17 |
| 5,845,914 | A | * | 12/1998 | Lenkman | 280/43.17 |
| 5,940,932 | A | | 8/1999 | LaHay | 16/30 |
| 6,095,533 | A | | 8/2000 | Balolia | 280/35 |
| 6,109,625 | A | | 8/2000 | Hewitt | 280/43.24 |
| 6,371,496 | B1 | | 4/2002 | Balolia | 280/35 |

FOREIGN PATENT DOCUMENTS

CA 2267043 8/2002

* cited by examiner

Primary Examiner—D. Glenn Dayoan
Assistant Examiner—H. Gutman
(74) Attorney, Agent, or Firm—Howard & Howard

(57) ABSTRACT

A mobile base assembly wherein a plurality of wheels 12 are attached to a frame 14 for movably supporting the frame 14 on a support surface 16 and an anchor mechanism 10 lifts the wheels 12 from the support surface 16 and anchors the frame 14 to the support surface 16. A pair of spaced plates (20 or 22) are attached to the frame 14 and an anchor member 34 is pivotally mounted between the plates (20 or 22) for pivotal movement between an anchor position (FIG. 4) and a retracted position (FIG. 3). A lever 70 is pivotally mounted between the plates (20 or 22) and presents a cam 72 for engaging and pivoting the anchor member 34 against the biasing reaction of a spring 60 from the retracted position to the anchor position. A foot 40 is attached to a foot flange extending from the anchor member 34 and has a base 42 for engaging the support surface 16 in the anchor position.

20 Claims, 2 Drawing Sheets

US 6,843,625 B2

FLOOR STOP FOR A MOBILE BASE

CROSS-REFERENCES TO RELATED APPLICATIONS

This application claims the benefit of co-pending provisional application 60/429,094 filed Nov. 26, 2002.

BACKGROUND OF THE INVENTION

1. Field of the Invention

The invention relates to mobile base assembly having wheels for supporting equipment for movement over a support surface and, more specifically, to an anchor mechanism for lifting the wheels from the support surface and anchoring the assembly to the support surface.

2. Description of the Related Art

Mobile base frames are well known to those skilled in the art for transporting heavy or awkward equipment. A typical mobile frame comprises a frame having wheels or some form of rolling mechanism attached to the frame to facilitate movement. The equipment is secured to the frame and is easily moved between locations because of the wheels attached to the frame. One of the problems encountered in developing a mobile frame is anchoring the mobile frame once the mobile frame is moved to a new location.

Prior art mechanisms have been developed to serve the purpose of anchoring mobile base frames. Brakes have been developed, such as are commonly employed on wheelchairs, in which a metal rod is clamped down laterally across one or more of the wheels. Still, other mechanisms have been developed for immobilizing wheeled contraptions by preventing wheel rotation. Such devices are very effective but have some drawbacks. In particular, if the frame is employed in a wet or corrosive environment, it would extend the life of the wheels to lift them off the floor. In addition, when using the frame under a heavy load for extended periods, it might prevent wheel damage to shift the weight off the wheels onto a more dispensable load-bearing mechanism.

As a result, there is a need in the art for a floor stop for a mobile base utilizing a lever to extend a stopping arm, thereby locking the base and, if desired, raising the wheels of a mobile frame off the ground.

BRIEF SUMMARY OF THE INVENTION AND ADVANTAGES

The invention provides a mobile base assembly for supporting equipment for movement over a support surface and comprising a frame, a plurality of wheels attached to the frame for movably supporting the frame on the support surface, and an anchor mechanism for lifting the wheels from the support surface and anchoring the frame to the support surface. The anchor mechanism includes at least one plate attached to the frame, an anchor member pivotally mounted on the plate for pivotal movement between an anchor position and a retracted position, and a foot attached to the anchor member and having a base for engaging the support surface in the anchor position. A biasing member reacts between the plate and the anchor member to bias the anchor member to pivot to the retracted position. A lever is pivotally mounted on the plate and presents a cam for engaging and pivoting the anchor member against the biasing reaction of the biasing member from the retracted position to the anchor position in response to the lever being moved from the retracted position to the anchor position.

Accordingly, the invention provides an anchor mechanism to prevent movement of the mobile base and, if desired, raise the wheels of a mobile frame off the support surface. The anchor mechanism may be attached to an existing frame or mobile unit as an after market device as well as an original equipment device.

BRIEF DESCRIPTION OF THE SEVERAL VIEWS OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figure 1:
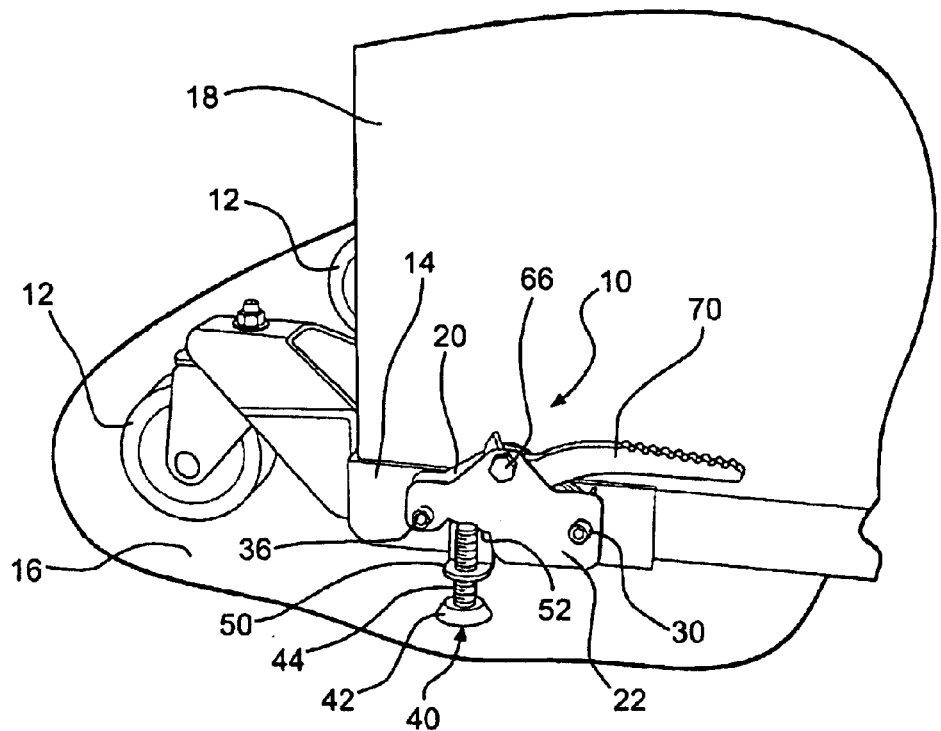
FIG. 1 is a side view of the anchor mechanism in the anchor position.

Referring to the Figures, wherein like numerals indicate like parts throughout the several views, an anchor mechanism is generally shown at 10 for lifting the wheels 12 supporting a frame 14 of a mobile base assembly from a support surface 16 and anchoring the frame 14 to the support surface 16. A plurality of wheels 12 is attached to the frame 14 for movably supporting the frame 14 on the support surface 16. The mobile base assembly supports equipment 18 for movement over the support surface 16, such a floor.

The anchor mechanism 10 includes inner 20 and outer 22 plates attached to the frame 14. The inner plate 20 contains a first set of spacer holes 24 and the outer plate 22 contains a second set of spacer holes 26 for alignment with the first set of spacer holes 24 of the inner plate 20. A plurality of cylindrical spacers 28 are disposed between the plates 20, 22 in alignment with the respective spacer holes 24, 26 for spacing the plates 20, 22 in spaced parallel relationship to one another. A plurality of pins extend through the aligned spacer holes 24, 26 and the spacers 28 and into the frame 14 for maintaining the plates 20, 22 in the parallel relationship and attached to the frame 14 with the inner plate 20 disposed adjacent to the frame 14.

Figure 3:
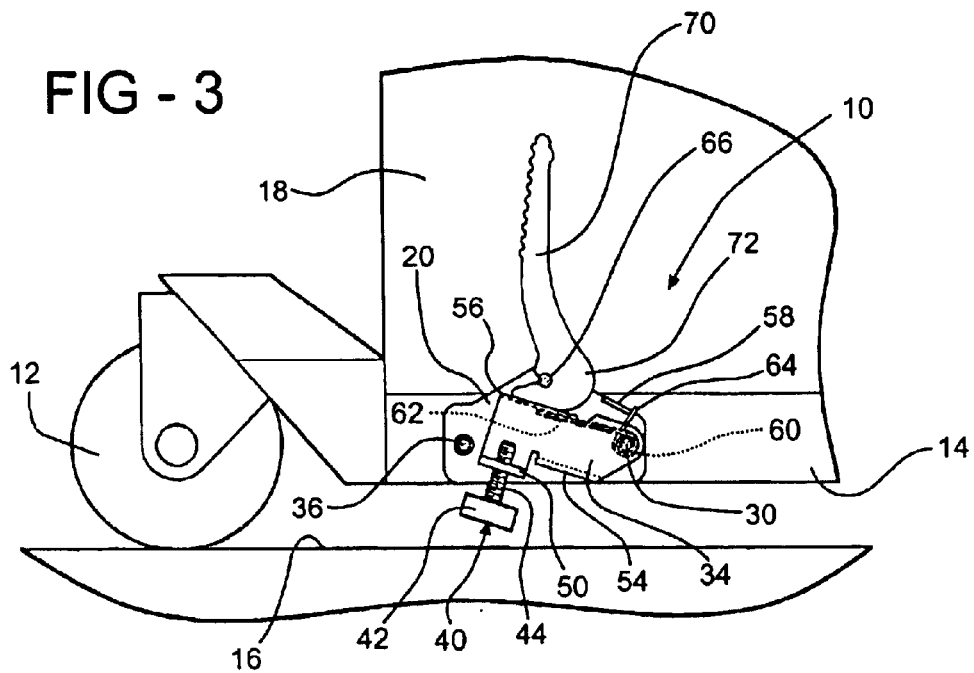
FIG. 3 is a side view of the anchor mechanism in the retracted position with the outer plate removed.
Figure 4:
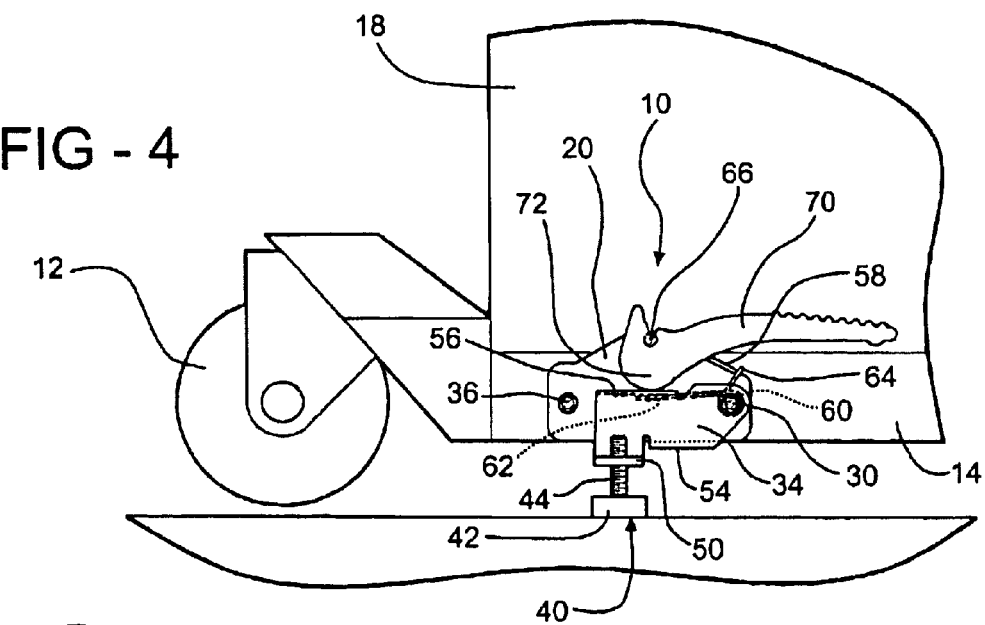
FIG. 4 is a side view of the anchor mechanism in the anchor position with the outer plate removed.

The plurality of pins includes a first pin 30, defined by a threaded bolt and nut 32, extending through a spacer 28 between the plates 20, 22 and pivotally mounting an anchor member 34 on and between the plates 20, 22 for pivotal movement between the anchor position of FIG. 4 and the retracted position of FIG. 3. The plurality of pins also includes a second pin 36, defined by a threaded bolt and nut 38, extending through a spacer 28 between the plates 20, 22 for maintaining the plates 20, 22 in the parallel relationship and attached to the frame 14 with the inner plate 20 disposed adjacent to the frame 14.

Figure 2:
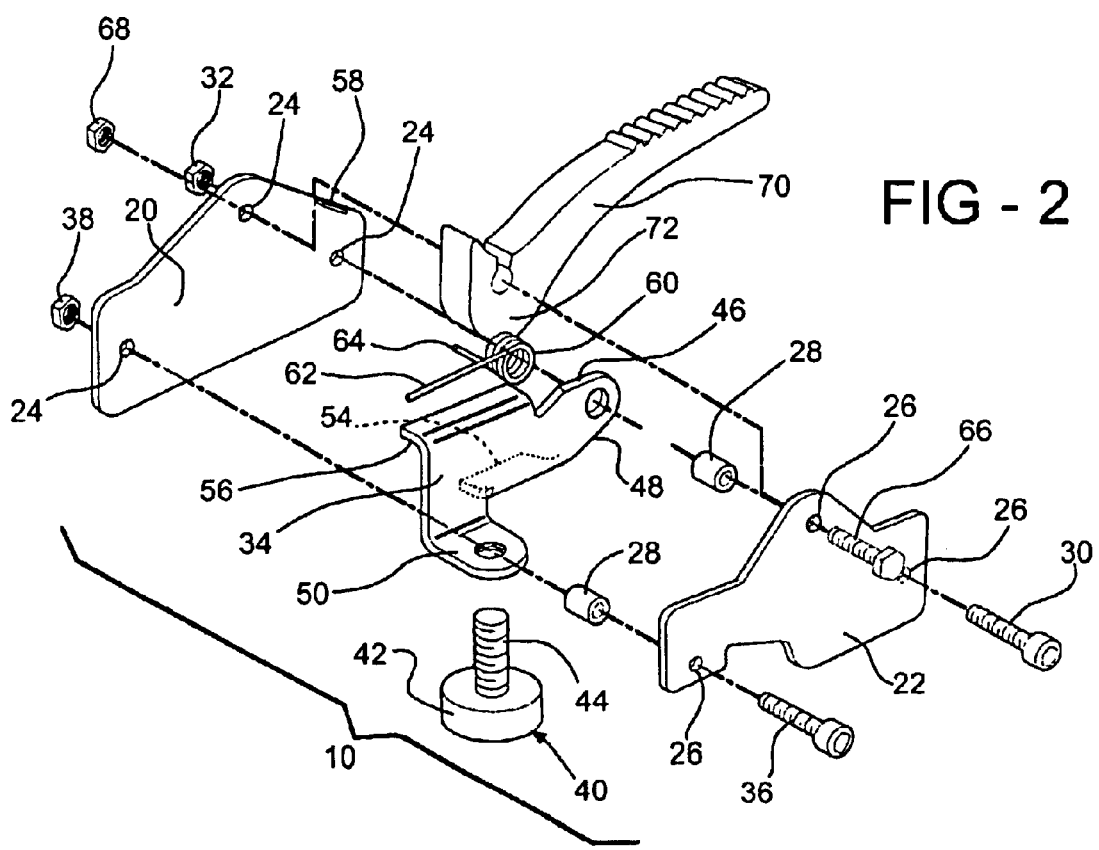
FIG. 2 is an exploded view of the anchor mechanism.
Figure 5:
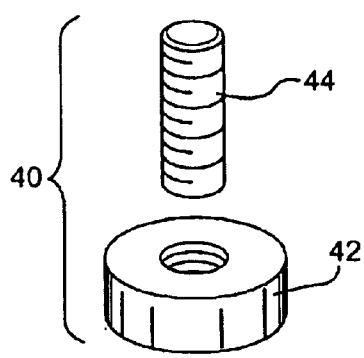
FIG. 5 is an exploded view of another embodiment of a foot.

A foot, generally indicated at 40, is attached to the anchor member 34 and includes a base 42 for engaging the support surface 16 in the anchor position and a threaded shaft 44 engaging a threaded hole in anchor member 34. The base 42 may be fixed to, e.g., integral with, the threaded shaft 44 or threaded to the threaded shaft 44 as illustrated in FIG. 5. More specifically, the anchor member 34, as shown in FIG. 2, includes top 46 and bottom 48 edges and presents a foot flange 50 extending laterally from the bottom edge 48 and attached to the foot 40. The anchor member 34 presents and the foot flange 50 extends laterally from the bottom edge 48 thereof to a distal edge underlying the outer plate 22 and defines a threaded hole disposed outside of the outer plate 22 for threadedly engaging the threaded shaft 44 of the foot 40. The outer plate 22 has a recess 52 therein for receiving the foot flange 50 in the retracted position. In addition, the anchor member 34 presents a guide flange 54, shown in phantom in FIG. 2, spaced along the bottom edge 48 from the foot flange 50 and extending laterally from the bottom edge 48 thereof to a distal edge adjacent the inner plate 20.

The anchor member 34 also presents a cam flange 56 extending laterally from the top edge 46 thereof toward the inner plate 20. The cam flange 56 and the guide flange 54 extend the same distance from the inner flat face of the anchor member 34 to space the anchor member 34 from the inner plate 20. A spring stop 58 extends inwardly from the inner plate 20 along the top edge 46 thereof. A spring 60 is coiled around the first pin 30 and has a first arm 62 disposed under the cam flange 56 and a second arm 64 engaging the spring stop 58 to define a biasing member for reacting between the inner plate 20 and the anchor member 34 to bias the anchor member 34 to pivot to the retracted position.

A lever pin 66, comprising a bolt and nut 68, extends between the plates 20, 22 above the anchor member 34 and a lever 70 is pivotally mounted on and between the plates 20, 22 via the lever pin 66 for movement between the anchor and retracted positions. More specifically, a cam 72 is disposed on or protrudes from the lever 70 for engaging the cam flange 56 and pivoting the anchor member 34 against the biasing reaction of the spring 60 from the retracted position (FIG. 3) to the anchor position (FIG. 4) in response to the lever 70 being moved from the retracted position to the anchor position. Accordingly, in addition to reacting with the arm 62 of the spring 60, the cam flange 56 extends laterally from the top edge 46 of the anchor member 34 toward the inner plate 20 for engaging the cam 72 on the lever 70 for pivoting the anchor member 34.

Obviously, many modifications and variations of the present invention are possible in light of the above teachings. The invention may be practiced otherwise than as specifically described within the scope of the appended claims. In addition, the reference numerals in the claims are merely for convenience and are not to be read in any way as limiting.

What is claimed is:

1. A mobile base assembly for supporting equipment (18) for movement over a support surface (16), said assembly comprising:

a frame (14);

a plurality of wheels (12) attached to said frame (14) for movably supporting said frame (14) on the support surface (16);

an anchor mechanism (10) for lifting said wheels (12) from the support surface (16) and anchoring said frame (14) to the support surface (16), said mechanism (10) comprising;

at least one plate (20 or 22) attached to said frame (14), an anchor member (34) pivotally mounted on said plate for pivotal movement between an anchor position and a retracted position and presenting a foot flange (50), a foot (40) attached to said foot flange (50) of said anchor member (34) and having a base (42) for engaging the support surface (16) in said anchor position, a biasing member (60) for reacting between said plate and said anchor member (34) to bias said anchor member (34) to pivot to said retracted position, a lever (70) pivotally mounted on said plate for movement between said anchor and retracted positions, and a cam (72) on said lever (70) for engaging and pivoting said anchor member (34) against the biasing reaction of said biasing member (60) from said retracted position to said anchor position in response to said lever (70) being moved from said retracted position to said anchor position.

2. An assembly as set forth in claim 1 wherein said anchor member (34) includes top (46) and bottom (48) edges and presents a cam flange (56) extending laterally from said top edge (46) thereof toward said at least one plate (20) for engaging said cam (72) on said lever (70) for pivoting said anchor member (34).

3. An assembly as set forth in claim 2 wherein said foot flange (50) extends laterally from said bottom edge (48), and said foot (40) threadedly engages said foot flange (50).

4. An assembly as set forth in claim 3 wherein said at least one plate includes inner (20) and outer (22) plates in spaced parallel relationship to one another, a first pin (30) extending between said plates (20, 22) and pivotally mounting said anchor member (34) between said plates (20, 22) for pivotal movement between said anchor position and said retracted position.

5. An assembly as set forth in claim 4 wherein said outer plate (22) defines a recess (52) therein for receiving said foot flange (50) in said retracted position.

6. An assembly as set forth in claim 4 wherein said anchor member (34) presents a guide flange (54) spaced along said bottom edge (48) from said foot flange (50) and extending laterally from said bottom edge (48) thereof to a distal edge adjacent said inner plate (20).

7. An assembly as set forth in claim 5 wherein said foot flange (50) extends laterally from said bottom edge (48) of said anchor member (34) to a distal edge underlying said outer plate (22), said foot (40) supported by said foot flange (50) outside of said outer plate (22).

8. An assembly as set forth in claim 4 including a lever pin (66) extending between said plates (20), (22) above said anchor member (34), said lever (70) being pivotally mounted on said lever pin (66) between said plates (20), (22) for movement between said anchor and retracted positions.

9. An assembly as set forth in claim 4 including a spring stop (58) extending inwardly from said inner plate (20), said biasing member comprising a coiled spring (60) coiled around said first pin (30) and having a first arm (62) disposed under said cam flange (56) and a second arm (64) engaging said spring stop (58) to react between said inner plate (20) and said anchor member (34) to bias said anchor member (34) to pivot to said retracted position.

10. A mobile base assembly for supporting equipment (18) for movement over a support surface (16), said assembly comprising:

a frame (14);

a plurality of wheels (12) attached to said frame (14) for movably supporting said frame (14) on the support surface (16);

an anchor mechanism (10) for lifting said wheels (12) from the support surface (16) and anchoring said frame (14) to the support surface (16), said mechanism (10) comprising;

an inner plate (20) containing a first set of spacer holes (24), an outer plate (22) containing a second set of spacer holes (26) for alignment with said first set of spacer holes (24) of said inner plate (20), a plurality of cylindrical spacers (28) disposed between said plates in alignment with said spacer holes (24, 26) for spacing said plates (20, 22) in spaced parallel relationship to one another, a plurality of pins (30, 36) extending through said aligned spacer holes (24, 26) and said spacers (28) and into said frame (14) for maintaining said plates (20, 22) in said parallel relationship and attached to said frame (14) with said inner plate (20) disposed adjacent to said frame (14), an anchor member (34) having top (46) and a bottom (48) edges and pivotally mounted on a first (30) of said pins between said plates (20, 22) for pivotal movement between an anchor position and a retracted position, said anchor member (34) presenting a foot flange (50) extending laterally from said bottom edge (48) thereof to a distal edge underlying said outer plate (22) and defining a threaded hole disposed outside of said outer plate (22), said anchor member (34) presenting a guide flange (54) spaced along said bottom edge (48) from said foot flange (50) and extending laterally from said bottom edge (48) thereof to a distal edge adjacent said inner plate (20), said outer plate (22) having a recess (52) therein for receiving said foot flange (50) in said retracted position, a foot (40) having a base (42) for engaging the support surface (16) in said anchor position and a threaded shaft (44) engaging said threaded hole in said foot flange (50), said anchor member (34) presenting a cam flange (56) extending laterally from said top edge (46) thereof toward said inner plate (20), a spring stop (58) extending inwardly from said inner plate (20), a spring (60) coiled around said first pin (30) and having a first arm (62) disposed under said cam flange (56) and a second arm (64) engaging said spring stop (58) to react between said inner plate (20) and said anchor member (34) to bias said anchor member (34) to pivot to said retracted position, a lever pin (66) extending between said plates (20, 22) above said anchor member (34), a lever (70) pivotally mounted on said lever pin (66) between said plates (20, 22) for movement between said anchor and retracted positions, and a cam (72) on said lever (70) for engaging said cam flange (56) and pivoting said anchor member (34) against the biasing reaction of said spring (60) from said retracted position to said anchor position in response to said lever (70) being moved from said retracted position to said anchor position.

11. An anchor mechanism (10) for anchoring a frame (14) normally supported by wheels (12) to a support surface (16), said mechanism (10) comprising;

at least one plate (20 or 22) for attachment to said frame (14), an anchor member (34) pivotally mounted on said plate for pivotal movement between an anchor position and a retracted position and presenting a foot flange (50) extending laterally, a foot (40) attached to said foot flange (50) of said anchor member (34) and having a base (42) for engaging the support surface (16) in said anchor position, a biasing member (60) for reacting between said plate and said anchor member (34) to bias said anchor member (34) to pivot to said retracted position, a lever (70) pivotally mounted on said plate for movement between said anchor and retracted positions, and a cam (72) on said lever (70) for engaging and pivoting said anchor member (34) against the biasing reaction of said biasing member (60) from said retracted position to said anchor position in response to said lever (70) being moved from said retracted position to said anchor position.

12. A mechanism as set forth in claim 11 wherein said anchor member (34) includes top (46) and bottom (48) edges and presents a cam flange (56) extending laterally from said top edge (46) thereof toward said at least one plate (20) for engaging said cam (72) on said lever (70) for pivoting said anchor member (34).

13. A mechanism as set forth in claim 12 wherein said foot flange (50) extends laterally from said bottom edge (48) and said foot (40) threadedly engages said foot flange (50).

14. A mechanism as set forth in claim 13 wherein said at least one plate includes inner (20) and outer (22) plates in spaced parallel relationship to one another, a first pin (30) extending between said plates (20, 22) and pivotally mounting said anchor member (34) between said plates (20, 22) for pivotal movement between said anchor position and said retracted position.

15. A mechanism as set forth in claim 14 wherein said outer plate (22) defines a recess (52) therein for receiving said foot flange (50) in said retracted position.

16. A mechanism as set forth in claim 14 wherein said anchor member (34) presents a guide flange (54) spaced along said bottom edge (48) from said foot flange (50) and extending laterally from said bottom edge (48) thereof to a distal edge adjacent said inner plate (20).

17. A mechanism as set forth in claim 15 wherein said foot flange (50) extends laterally from said bottom edge (48) of said anchor member (34) to a distal edge underlying said outer plate (22), said foot (40) supported by said foot flange (50) outside of said outer plate (22).

18. A mechanism as set forth in claim 14 including a lever pin (66) extending between said plates (20, 22) above said anchor member (34), said lever (70) being pivotally mounted on said lever pin (66) between said plates (20, 22) for movement between said anchor and retracted positions.

19. A mechanism as set forth in claim 14 including a spring stop (58) extending inwardly from said inner plate (20), said biasing member comprising a coiled spring (60) coiled around said first pin (30) and having a first arm (62) disposed under said cam flange (56) and a second arm (64) engaging said spring stop (58) to react between said inner plate (20) and said anchor member (34) to bias said anchor member (34) to pivot to said retracted position.

20. An anchor mechanism (10) for lifting the wheels (12) supporting a frame (14) from a support surface (16) and anchoring the frame (14) to the support surface (16), said mechanism (10) comprising;

an inner plate (20) containing a first set of spacer holes (24), an outer plate (22) containing a second set of spacer holes (26) for alignment with said first set of spacer holes (24) of said inner plate (20), a plurality of cylindrical spacers (28) disposed between said plates (20, 22) in alignment with said spacer holes (24, 26) for spacing said plates (20, 22) in spaced parallel relationship to one another, a plurality of pins (30, 36) extending through said aligned spacer holes (24, 26) and said spacers (28) for maintaining said plates (20, 22) in said parallel relationship, an anchor member (34) having top (46) and a bottom (48) edges and pivotally mounted on a first (30) of said pins between said plates (20,22) for pivotal movement between an anchor position and a retracted position, said anchor member (34) presenting a foot flange (50) extending laterally from said bottom edge (48) thereof to a distal edge underlying said outer plate (22) and defining a threaded hole disposed outside of said outer plate (22), said anchor member (34) presenting a guide flange (54) spaced along said bottom edge (48) from said foot flange (50) and extending laterally from said bottom edge (48) thereof to a distal edge adjacent said inner plate (20), said outer plate (22) having a recess (52) therein for receiving said foot flange (50) in said retracted position, a foot (40) having a base (42) for engaging the support surface (16) in said anchor position and a threaded shaft (44) engaging said threaded hole in said foot flange (50), said anchor member (34) presenting a cam flange (56) extending laterally from said top edge (46) thereof toward said inner plate (20), a spring stop (58) extending inwardly from said inner plate (20), a spring (60) coiled around said first pin (30) and having a first arm (62) disposed under said cain flange (56) and a second arm (64) engaging said spring stop (58) to react between said inner plate (20) and said anchor member (34) to bias said anchor member (34) to pivot to said retracted position, a lever pin (66) extending between said plates (20, 22) above said anchor member (34), a lever (70) pivotally mounted on said lever pin (66) between said plates (20,22) for movement between said anchor and retracted positions, and a cam (72) on said lever (70) for engaging said cam flange (56) and pivoting said anchor member (34) against the biasing reaction of said spring (60) from said retracted position to said anchor position in response to said lever (70) being moved from said retracted position to said anchor position.

* * * * *